United States Patent
Aizawa et al.

(10) Patent No.: US 7,024,982 B2
(45) Date of Patent: Apr. 11, 2006

(54) COMBINATION OF PISTON AND PISTON RING

(75) Inventors: Takeshi Aizawa, Saitama (JP); Manabu Kishida, Saitama (JP); Makoto Kajiwara, Saitama (JP)

(73) Assignee: Nippon Piston Ring Co., Ltd., (JP)

( * ) Notice: Subject to any disclaimer, the term of this patent is extended or adjusted under 35 U.S.C. 154(b) by 0 days.

(21) Appl. No.: 10/647,219

(22) Filed: Aug. 26, 2003

(65) Prior Publication Data

US 2004/0040436 A1 Mar. 4, 2004

(30) Foreign Application Priority Data

Aug. 30, 2002 (JP) ............................ P2002-252355

(51) Int. Cl.
*F16J 9/26* (2006.01)

(52) U.S. Cl. .................. 92/208; 277/442; 277/443

(58) Field of Classification Search .................. 92/255, 92/257, 208, 216, 219; 277/440, 442, 443, 277/449, 456
See application file for complete search history.

(56) References Cited

U.S. PATENT DOCUMENTS

| | | | | | |
|---|---|---|---|---|---|
| 3,575,433 | A | * | 4/1971 | Beyer et al. | 277/444 |
| 3,661,402 | A | * | 5/1972 | Iizuka | 277/442 |
| 3,810,640 | A | * | 5/1974 | Ahlen | 277/579 |
| 4,074,616 | A | * | 2/1978 | Gale et al. | 277/456 |
| 4,233,490 | A | * | 11/1980 | Shalai et al. | 277/456 |
| 4,679,493 | A | * | 7/1987 | Munro et al. | 92/212 |
| 5,241,748 | A | * | 9/1993 | Ishida | 29/888.074 |
| 5,258,930 | A | * | 11/1993 | Fukuyoshi et al. | 702/38 |
| 5,743,012 | A | * | 4/1998 | Adams et al. | 29/888.043 |
| 5,972,128 | A | * | 10/1999 | Miwa | 148/321 |
| 6,235,415 | B1 | * | 5/2001 | Ogawa et al. | 428/698 |

OTHER PUBLICATIONS

Metals Handbook, Dec. 1998, ASM International, 2nd edition, p. 319.*

* cited by examiner

*Primary Examiner*—Edward K. Look
*Assistant Examiner*—Michael Leslie
(74) *Attorney, Agent, or Firm*—Nixon & Vanderhye PC (57) ABSTRACT

A combination of piston and piston ring includes a piston having a piston ring groove in which at least the groove portion of the piston is made of steel, a piston ring made of cast iron and fitted into the piston ring groove, and a hard coat film formed to at least an outer peripheral sliding surface of the piston ring.

12 Claims, 4 Drawing Sheets

COMBINATION OF PISTON AND PISTON RING

BACKGROUND OF THE INVENTION

1. Field of the Invention

The present invention relates to a combination of a piston and a piston ring, or a piston assembly, which is applicable to a high-powered internal combustion engine, and more particularly applicable to a high-powered internal combustion engine such as a diesel engine operated at high temperature and high combustion pressure.

2. Description of the Related Art

In a conventional diesel engine, there has been generally used a combination of a piston made of aluminum or a piston made of aluminum having a wear-resistant ring (so called, "ring carrier") and a piston ring having a hard film formed at an outer peripheral sliding surface of the piston ring, the piston ring being subjected to a nitriding treatment as occasion demands.

However, in recent years, a demand for realizing a high-powered internal combustion engine has been increasing from the point of view of environmental protection. Under such high-powered operation accompanying high combustion temperature and high combustion pressure, the aforementioned aluminum-based piston has been durability, heat resistance and the like. Accordingly, there has been investigated a piston made of steel capable of improved performance even under high-powered operating conditions.

However, where the aforementioned piston made of steel and the piston ring made of steel is adopted, a lower surface of the piston ring is liable to stick to a lower surface of the piston ring groove due to friction heat. When such a phenomenon is observed, there has been a possibility of problems such that a following-up property of the piston ring with respect to a cylinder liner would be remarkably lowered, so that the functions inherently required for the piston ring cannot be achieved.

SUMMARY OF THE INVENTION

The present invention was conceived to substantially reduce defects or drawbacks encountered in the prior art mentioned above, and an object of the present invention is to provide a combination of piston and piston ring which has excellent durability and is capable of being used in a high-powered internal combustion engine such as a high-powered diesel engine or the like operated under high combustion temperature and a high combustion pressure.

In order to achieve the above object, the inventors of the present invention investigated the aforementioned phenomenon of sticking caused by adhesion. As a result, the following fact was confirmed. Namely, from the fact that a definite contact-flaw formed by a contact of an upper surface of the piston ring to an upper surface of the piston ring groove was not observed, it was confirmed that the piston ring was pressed and closely contacted to the lower surface of the piston ring groove. Further, the lower surface of the piston ring contacting to the lower surface of the piston ring groove was in an oxygen-depleted state at a center portion of the lower surface of the piston ring.

Under this contacting state, when the contact portion underment micromotion-friction caused by a large heat load and piston flap, the adhesion phenomenon occurred at the closely contacting portion, thus confirming that the aforementioned sticking due to friction heat occurred.

A combination of piston and piston ring for reducing the aforementioned problems has been achieved on the basis of the aforementioned findings. That is, an improved structure is provided by a combination of piston and piston ring, including: a piston having a piston ring groove in which at least the piston ring groove is made of steel, the piston reciprocally moving in a cylinder bore; a piston ring made of flake graphite cast iron, spheroidal graphite cast iron, white cast iron, malleable cast iron, vermicular gaphite cast iron, or alloy cast iron having an elastic modulus ranging from 130000 to 170000 MPa, and fitted into to the piston ring groove; and a hard coat film formed to at least an outer peripheral sliding surface of the piston ring.

Since the piston ring made of cast iron is fitted into the piston, at least the piston ring groove portion being made of steel, even in the event that the contact portion between the piston ring and the piston ring groove is applied with a large heat load and micromotion-friction under the condition that the lower surface of the piston ring is closely contacted to the lower surface of the piston ring groove, irregularities (micro-convexoconcaves) are formed on the lower surface of the piston ring due to the existence of graphite peculiar to the cast iron constituting the piston ring, and the irregularities contribute to form oil sumps. Simultaneously, the graphite itself functions as a self-lubricating substance, so that the adhesion phenomenon would not occur at the contact portion between the piston ring and the piston ring groove as a mate member made of steel. Further, since the elastic modulus of the piston ring is set within the range from 130000 to 170000 MPa, it is easy for the piston ring to follow up with respect to the cylinder liner.

As a result, there can be provided a combination of piston and piston ring which is excellent in durability and capable of being suitably applied to a high-powered internal combustion engine such as a high-powered diesel engine or the like which is operated under the conditions of a high combustion temperature and a high combustion pressure.

Furthermore, in the above combination of piston and piston ring, it is preferable that the hard coat film is an ion-plating film and/or the piston ring is subjected to a nitriding treatment.

When the piston ring is subjected to the hardening treatment as described above, it becomes possible to provide a combination of piston and piston ring which is excellent in wear resistant property and durability even under the environment condition of high-intensity combustion as performed in the high-powered diesel engine or the like.

The present invention will become more apparent upon a consideration of the following detailed explanations of the preferred embodiments of the present invention taken in conjunction with the accompanying drawings.

BRIEF DESCRIPTION OF THE DRAWINGS

In the accompanying drawings:

FIG 2, including

DESCRIPTION OF THE PREFERRED EMBODIMENTS

Figure 1:
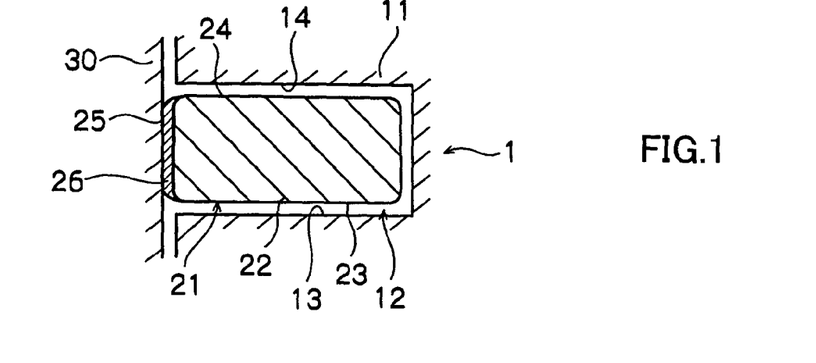
FIG. 1 is a cross sectional view showing one embodiment of a combination of piston and piston ring according to the present invention.

Embodiments of a combination 1 of piston and piston ring according to the present invention will be described below with reference to FIGS. 1 and 2.

[Piston]

As a piston 11, there is adopted a piston having a piston ring groove 12 which is at least made of steel. For example, there would be used a piston which is entirely made of steel, or a piston of which at least the piston ring groove 12 is made of steel while portions other than the piston ring groove 12 might be made of metal such, as aluminum alloy or the like.

A material for the steel is not particularly limited as far as the material has been conventionally used for constituting the piston. The examples of the material may include: SKD6 (JIS (Japanese Industrial Standard) code of steel for hot-rolling die), SUS304 (JIS code of austenitic stainless steel), SUS630 (JIS code of precipitation-hardened type stainless steel) or the like that are required to have both wear-resistant property and hardness.

[Piston Ring]

As a piston ring 21, a piston ring made of flake graphite cast iron, spheroidal graphite cast iron, white cast iron, malleable cast iron, vermicular graphite (compacted graphite) cast iron or alloy cast iron, having an elastic modulus ranging from 130000 to 170000, is adapted.

Further, it is to be noted that the spheroidal graphite cast iron is particularly preferred as a material for constituting the piston ring 21 from viewpoints of excellent following-up property and high strength based on the elastic modulus thereof as described later on. As a procedure (manufacturing process, heat treatment or the like) for manufacturing the piston ring composed of cast iron, the procedures that have been conventionally performed can be also applied.

The piston ring 21 made of the above-mentioned cast iron is formed with irregularities on the surface due to the existence of graphite peculiar to cast iron. Therefore, even in a case where the lower surface 23 of the piston ring 21 is closely contacted to the lower surface 13 of the piston ring groove 12, the irregularities would function as oil sumps in which lubricating oil is retained, and the graphite functions as a self-lubricating substance. Further, since the elastic modulus of the piston ring 21 is set within the range from 130000 to 170000 MPa, it is easy for the piston ring 21 to follow up with respect to the cylinder liner 30 during reciprocal motion of the piston 11 in the cvii nder bore. As a result, the adhesion phenomenon would not occur even if a micromotion friction (i.e. a friction caused by a fine motion of the piston ring in the piston ring groove) is applied to the contact portion between the piston ring 21 and the piston ring groove 12 made of steel as an object member.

Out of these various piston rings 21, a spheroidal graphite cast iron having an elastic modulus ranging from 150,000 to 170,000 MPa is be more preferably usable.

The piston ring 21 made of cast iron having the above range of elastic modulus can exhibit an excellent following-up property with respect to a cylinder liner 30 during reciprocal motion of the piston 11 in the cylinder bore. Further, the elastic modulus of the material constituting the piston ring 21 is calculated from data of a stress-strain diagram obtained by conducting a tensile test for the material.

When the elastic modulus exceeds 170,000 MPa, there may cause a case that the following-up property of the piston ring 21 with respect to the cylinder liner 30 would be somewhat deteriorated. On the other hand, when the elastic modulus is less than 130,000 MPa, the piston ring becomes excessively soft. In this case, there may also cause a case that the following-up property of the piston ring 21 with respect to the cylinder liner 30 would be somewhat deteriorated.

In a high-intensity operation of a diesel engine or the like in which a high combustion temperature and a high combustion pressure are present, temperature differences are caused among respective portions of the piston ring. Especially, the temperature of a gap portion (i.e., outer peripheral portion) of the piston ring becomes high.

In the conventional piston ring made of steel, since the elastic modulus thereof is large (e.g about 200,000 MPa), an end portion of the gap portion expanded due to the temperature difference strongly abuts against the cylinder liner 30 formed to an inner surface of the cylinder bore to thereby easily cause abnormal wear or abrasion.

However, the elastic modulus of the piston ring 21 is set within the range prescribed hereinbefore, and the piston ring 21 can easily slide along the shape of the inner peripheral portion of the cylinder liner 30. Therefore, the expanded gap portion of the piston ring 21 would not strongly abut against the inner peripheral surface of cylinder liner 30, thus effectively suppressing the occurrence of the abnormal wear.

It is preferred that a hard coat film is formed to at least an outer peripheral sliding surface 25 of the piston ring 21, and the hard coat film is composed of an ion-plating film 26. As the ion-plating film 26, Cr—N type film, Cr—B—N type film or the like are preferably adopted. The piston ring 21 formed with such ion-plating film 26 at the outer peripheral sliding surface 25 can exhibit an excellent wear resistance even under the high-intensity combustion conditions applied to the diesel engine or the like.

In this connection, a hardness of the ion-plating film 26 is preferably set within a range of 1000 to 2200 Hv in terms of Vickers hardness. Further, a thickness of the ion-plating film 26 is preferably set within a range of 10 to 70 μm.

Figure 2A:
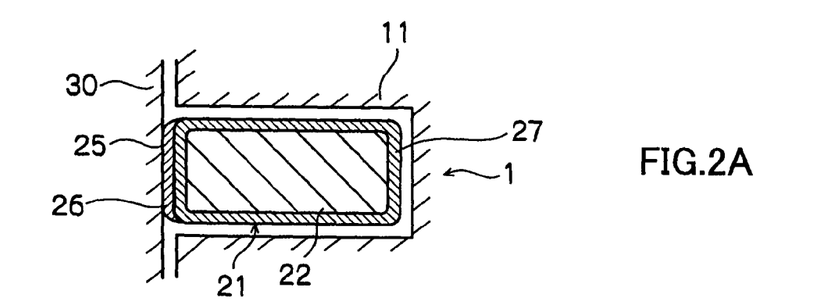
FIGS. 2A to 2C, is a cross sectional view showing the combination of piston and piston ring according to the present exemplary embodiment of the invention.
Figure 2B:
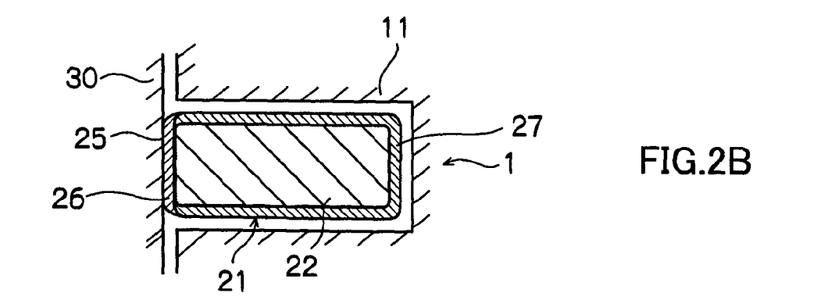
Figure 2C:
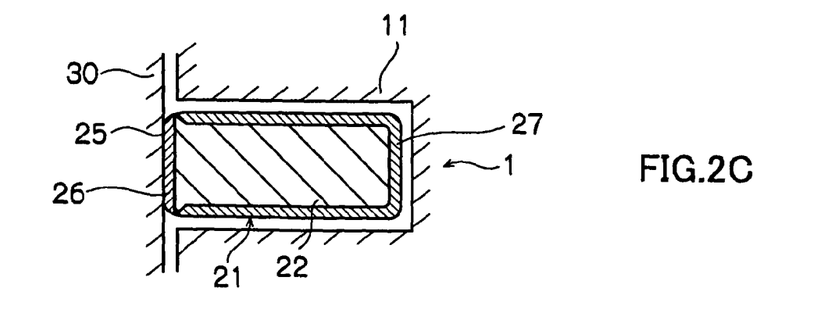

Further, as shown in FIGS. 2A to 2C, it is preferred that a nitrided layer 27 is formed to the piston ring 21 formed with the ion-plating film 26 as occasion demands. The nitrided layer 27 may be arbitrarily provided to the piston ring 21 so as to be formed to an entire outer periphery of the piston ring 21 as shown in FIG. 2A, or the nitrided layer 27 is formed to only the upper and lower surfaces and the inner peripheral surface of the piston ring 21 as shown in FIGS. 2B and 2C.

Examples of a method of forming the nitrided layer 27 to only the upper and lower surfaces and the inner peripheral surface of the piston ring 21 may include:(i) a method comprising the steps of: conducting a nitriding treatment to a piston ring base metal 22 made of cast iron; removing the nitrided layer 27 formed to the outer peripheral sliding surface 25; and forming the ion-plating film 26 to the outer peripheral sliding surface 25 (see FIG. 2B); and (ii) a method comprising the steps of: forming the ion-plating film 26 to the outer peripheral sliding surface 25 of a piston ring base metal 22 made of cast iron; and conducting a nitriding treatment to a piston ring base metal 22 made of cast iron so as to form a nitrided layer to only the upper and lower surfaces and the inner peripheral surface of the piston ring 21 (see FIG. 2C).

The nitrided layer 27 can be formed in accordance with the method such as gas nitriding method, ion nitriding method, salt-bath nitrocarburizing method, plasma nitriding method or the like that has been conventionally available. Further, a thickness of the nitrided layer 27 is preferably set within a range of 5 to 10 μm.

Further, a hardened carbon film or a Cr-plating film in place of the ion plating film 26 may be also formed to the outer peripheral sliding portion 25 of the piston ring 21. However, the ion plating film 26 is particularly preferable in view of achieving excellent productivity and sliding property of the piston ring 21.

The piston ring 21 prepared as above can be used as either one of a top ring, a second ring and an oil ring for a piston assembly or can be used as all of the above rings. In particular, the piston ring 21 will be suitably used as the top ring for the piston assembly.

[Combination of Piston and Piston Ring]

As described above, the combination 1, as piston assembly, of the piston and the piston ring comprises a piston 11 formed with a piston ring groove 12 in which least the piston ring groove portion of the piston is made of steel, the piston 11 reciprocally moving in a cylinder bore, a piston ring 21 fitted into the piston ring groove 12, and a hard coat film formed to at least outer peripheral sliding surface of the piston ring 21.

According to such combined structure or assembly, even if a large heat load and a micromotion friction are applied under a state that the lower surface 23 of the piston ring 21 is closely contacted to the lower surface 13 of the piston ring groove 12, the irregularities are formed on the lower surface 23 of the piston ring 21 due to an influence of graphite peculiar to the cast iron constituting the piston ring 21, and the irregularities contribute to form oil sumps in which a lubricating oil is retained. Simultaneously, the graphite itself functions as a self-lubricating substance, providing an unexpected results such that the adhesion phenomenon between the piston ring 21 and the piston ring groove 12 as the object member made of steel would not occur at all.

Although the combination structure defined in the present invention can effectively suppress the adhesion phenomenon occurring at the contact portion between the piston and the piston ring, the technical idea and concept of the present invention may be also applied to a sliding member involved with a similar problem of causing the adhesion.

Exemplary Embodiments

Hereunder, the present invention will be explained in more detail with reference to the following Examples and Comparative Examples. In the following explanation, the term "%" means "mass %", unless otherwise noted specifically.

EXAMPLES 1 to 8

A piston 11 made of SKD6 (JIS code) was combined to a piston ring 21 made of flake graphite cast iron having a composition (C:2.9%, Si:1.3%, Mn:0.8%, P:0.2%, S:0.05%, Ni:0.5%, Cr:0.17%, Mo:0.5%, iron: balance), or a piston ring 21 made of spheroidal graphite cast iron having a composition (C:2.5%, Si:1.8%, Mn:0.7%, P:0.2%, S:0.05%, Cr:0.3%, Mo:0.5%, iron: balance) as shown in Table 1 to thereby prepare various piston assemblies (combination of piston and piston ring) as Examples 1 to 8, respectively.

Then, with respect to each of the combinations, various tests were conducted. As shown in Table 1, an ion plating film 26 was formed onto an outer peripheral sliding surface of the piston ring 21 used in Examples 1 to 8, respectively.

Further, a nitrided layer 27 was formed in accordance with a nitriding treatment as occasion demands as shown in Table 1.

More concretely, the ion plating film 26 was formed onto the outer peripheral sliding surface 25 of the piston ring 21 by means of ion-plating device so that a thickness of the ion plating film 26 was 3 μm. The ion plating film 26 was formed as a Cr—N type coat film having an integrated intensity ratio (Cr:5.7%, $Cr_2N$:7.9%, CrN:86.4%) or a Cr—B—N type coat film having another integrated intensity ratio (Cr:78.5%, B:1.2%, N:20.3%). The nitrided layer 27 was formed by salt-bath nitrocarburizing treatment under the conditions of temperature of 580° C. for 30 minutes so that a depth of the nitrided layer 27 was 10 μm.

The respective pistons 11 were combined to the piston rings 21 to prepare the respective test samples according to Examples 1 to 8. With respect to each of the test samples, a reciprocating friction test was conducted for evaluating the adhesion (sticking) property of the contact portion. Further, with respect to each of the piston rings 21 as test samples, a deflection fatigue strength test for evaluating the fatigue strength, an abrasion (wearing) test for evaluating the wear resistance, and an impact test for evaluating the closely contacting property of the hard coat film were conducted, respectively.

COMPARATIVE EXAMPLES 1 to 4

The same procedures as in Examples 1 to 4 were repeated except that a piston 11 made of SKD6 (JIS code) and a piston ring 21 made of SUS304 (JIS code, 17% Cr-stainless steel) were combined to each other to thereby prepare respective test samples of Comparative Examples 1 to 4 as shown in Table 1. Then, with respect to the test samples thus prepared, various evaluation tests were conducted in the same manner as in the above Examples.

[Reciprocal Motion Friction Test]

Figure 3:
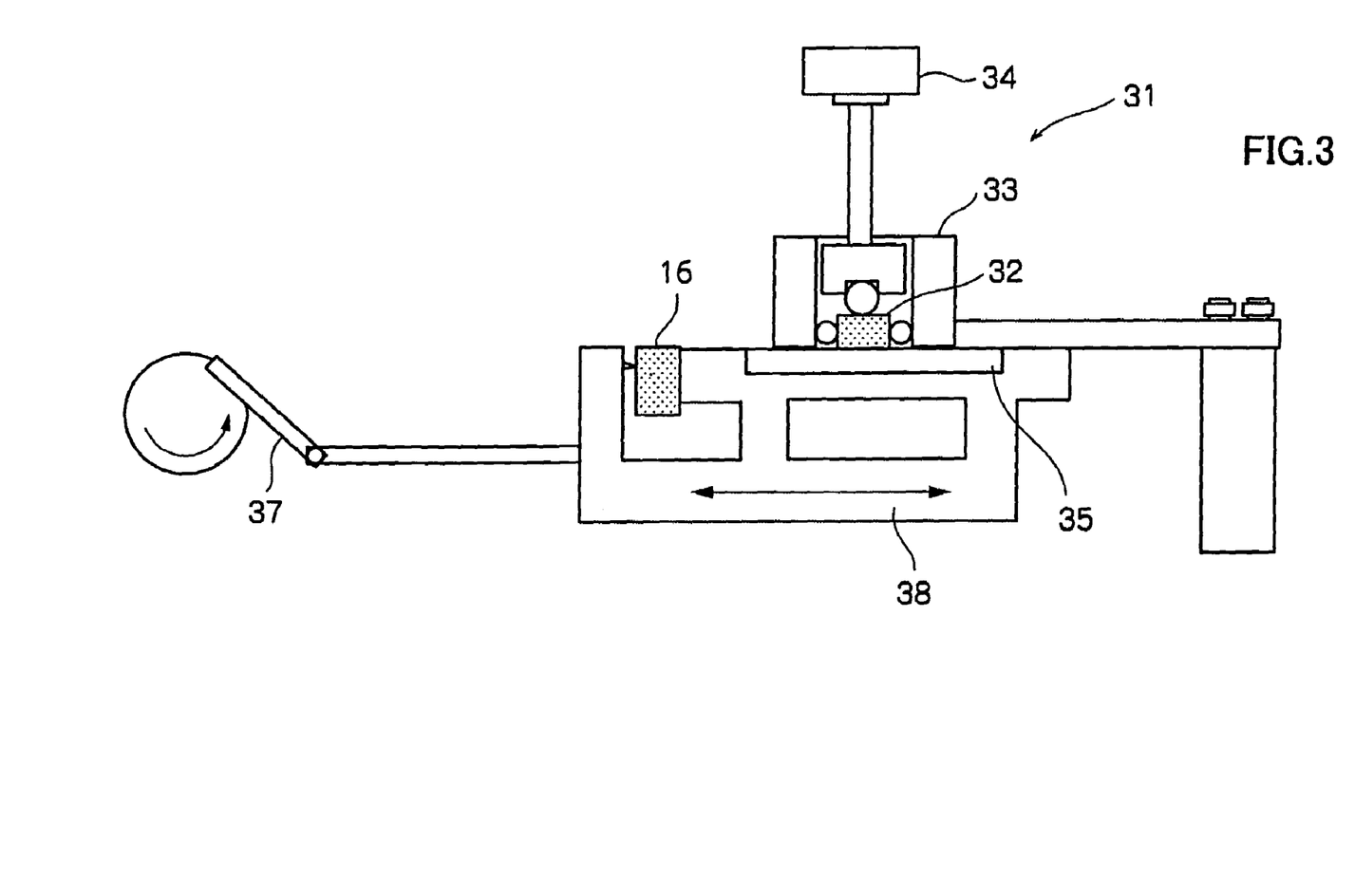
FIG. 3 is a schematic view showing a structure of a reciprocating-type friction-testing machine.

The reciprocal motion friction test for evaluating the adhesion property was conducted by utilizing a reciprocal motion friction testing machine 31 shown in FIG. 3. In this reciprocating friction testing machine 31, a test sample 32 corresponding to the piston ring member having a block-shape and a size of 7 mm×8 mm×5 mm was then supported by a fixing block 33. A downward load was applied to the test sample 32 from an upper side by means of a hydraulic cylinder 34 so as to press a test sample 35 corresponding to the piston member having a plate-shape and a size of 20 mm×15 mm×3 mm.

The test sample 35 was supported by a movable block 36, and then reciprocated within a horizontal plane through an operation of a crank mechanism 37. As the test samples 32 corresponding to the piston ring, the piston rings of Examples 1 to 8 and Comparative Examples 1 to 4 were used. On the other hand, as the test samples 35 corresponding to the pistons, the pistons made of SKD6 were respectively used.

The reciprocal motion friction test was conducted without using any lubricant or like under the testing conditions of a sliding speed of to 0.5 Hz, a test load of 10 kgf, and a testing time for 30 minutes.

The occurrence of adhesion caused by sticking (burn-out) of the contact portion was confirmed as change of a friction force due to an abnormal rise in friction coefficient at the contact portion, the change being detected by a load cell 16. The occurrence of adhesion was also confirmed by observing a metal structure of the contact point with a magnifying glass.

As is clear form the results shown in Table 1, the occurrence of adhesion (sticking) was not observed in the combinations of Examples 1 to 8. In contrast, in the combinations of Comparative Examples 1 to 4, the abnormal rise in friction coefficient at the contact portion was observed and detected through the load cell, and the adhesion (sticking) occurred.

[Deflection Fatigue Strength Test]

Figure 4:
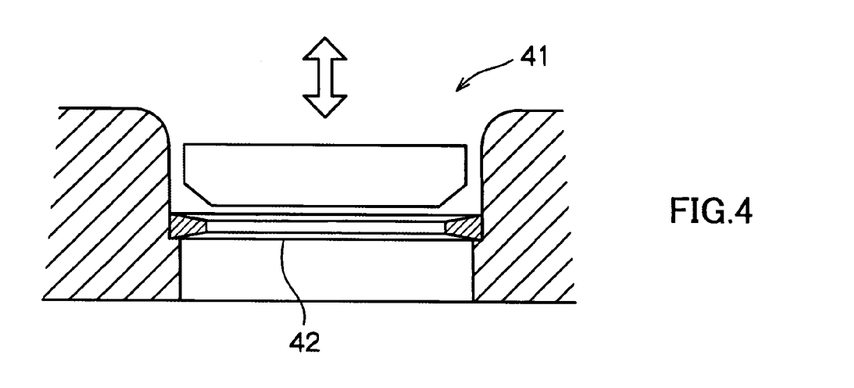
FIG. 4 is a schematic view showing a structure of a deflection fatigue-strength testing machine.

The deflection fatigue strength test for evaluating the strength of the piston ring was conducted by using a piston ring performance evaluation device as a deflection fatigue strength testing machine that has been known as disclosed in Japanese Patent Application (Laid-Open) No. 2001-208650, which is illustrated in FIG. 4.

In the above deflection fatigue strength testing machine, a strain gage was attached to the most outer peripheral surface of a 180 degreed-portion (a side opposing to the gap portion side) of the piston ring as the test sample 42. A repeated load having a magnitude due to a sine wave form having a frequency of 30 Hz was applied to the test sample (piston ring) from an upper side thereof by means of a jig 41 shown in FIG. 4. Note, The repeated load was generated by a hydraulically controlled-type fatigue strength testing machine, not shown. Further, as the test samples, the piston rings of Examples 1 to 8 and Comparative Examples 1 to 4 shown in Table 1 were used.

The test results were evaluated by a deflection fatigue strength index. This deflection fatigue strength index for each of the test samples (piston rings) was expressed as a relative ratio (%) of an actual deflection fatigue strength of one test sample with respect to that of Comparative Example 1 having a standard index of 100.

As shown in Table 1, in all cases of the test samples of Examples 1 to 8 and Comparative Examples 2 to 4, the deflection fatigue strength index was within a range of 99 to 101. Therefore, each of the piston rings was confirmed to exhibit sufficient fatigue strength.

[Abrasion Test]

Figure 5:
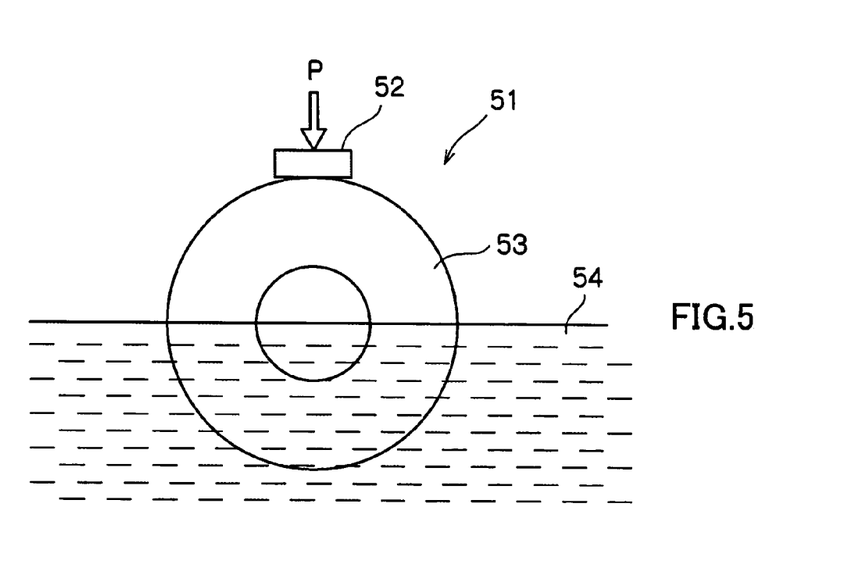
FIG. 5 is an illustration of a simple structure of an Amsler-type (universal) abrasion testing machine.

The abrasion test for evaluating a wear resistance (abrasion resistance) of the piston ring was performed by utilizing an Amsler type (universal-type) abrasion testing machine 51 shown in FIG. 5. In this abrasion testing machine 51, a test sample 52 having a size of 18 mm×12 mm×6 mm, corresponding to the piston ring, was used as a fixed segment. On the other hand, a dough-nut-shaped member having an outer diameter of 40 mm, an inner diameter of 16 mm and a thickness of 10 mm, was used as an object member (rotary segment) 53 corresponding to the cylinder liner. After the test sample 52 is come into contact with the object member 53 and a load P was applied to the test sample 52. Under this condition, the abrasion test was performed. Further, a lower portion of the object member 52 was immersed in lubricating oil 54.

As the test sample 52 corresponding to the piston ring, the test samples of Examples 1 to 8 and Comparative Examples 1 to 4 were used. The abrasion test using the respective test samples 52 was performed under the following conditions. Namely, a bearing oil was used as the lubricating oil, a temperature of the lubricating oil was set to 80° C., a peripheral speed of the mate member 53 was set to 1 m/sec. (rotation speed: 478 rpm), the load P was set to 150 kgf, the abrasion test was continued for 7 hours, and the mate member 53 was made of boron cast iron. Further, it is to be noted that an abrasion loss (wearing amount) was measured in such a manner that an abrasion thickness (µm) of the sliding surface was measured from an irregularity profile obtained by a roughness gauge.

As the test sample corresponding to the piston ring, the piston rings of Examples 1 to 8 and Comparative Examples 1 to 4 shown in Table 1 were used. Vickers hardness of the hard coat film (ion plating film) formed to the outer peripheral sliding surface of the respective piston rings was also measured, and the measured hardness as well as other data were indicated in Table 1.

In this connection, the wear resistance of each of the test samples was evaluated by an abrasion index which is calculated and expressed as a relative ratio of each abrasion loss (abrasion thickness) of the test samples of Examples 1 to 8 and Comparative Examples 2 to 4 with respect to that of Comparative Example 1 having a standard abrasion index of 100. Therefore, this means that the smaller than 100 the abrasion index becomes, the less the abrasion loss generates, and the more excellent wear resistance the test sample exhibits.

As shown in Table 1, the abrasion index of each of the test members (piston rings) was ranged from 98 to 100, and accordingly, each of the test members exhibited a sufficient wear resistance. Furthermore, even if there was a difference in hardness among the ion plating films (hard coat. films), the difference had not a great influence on the abrasion loss, so that each of the test members was proved to exhibit an excellent wear resistance.

[Impact Test]

Figure 6:
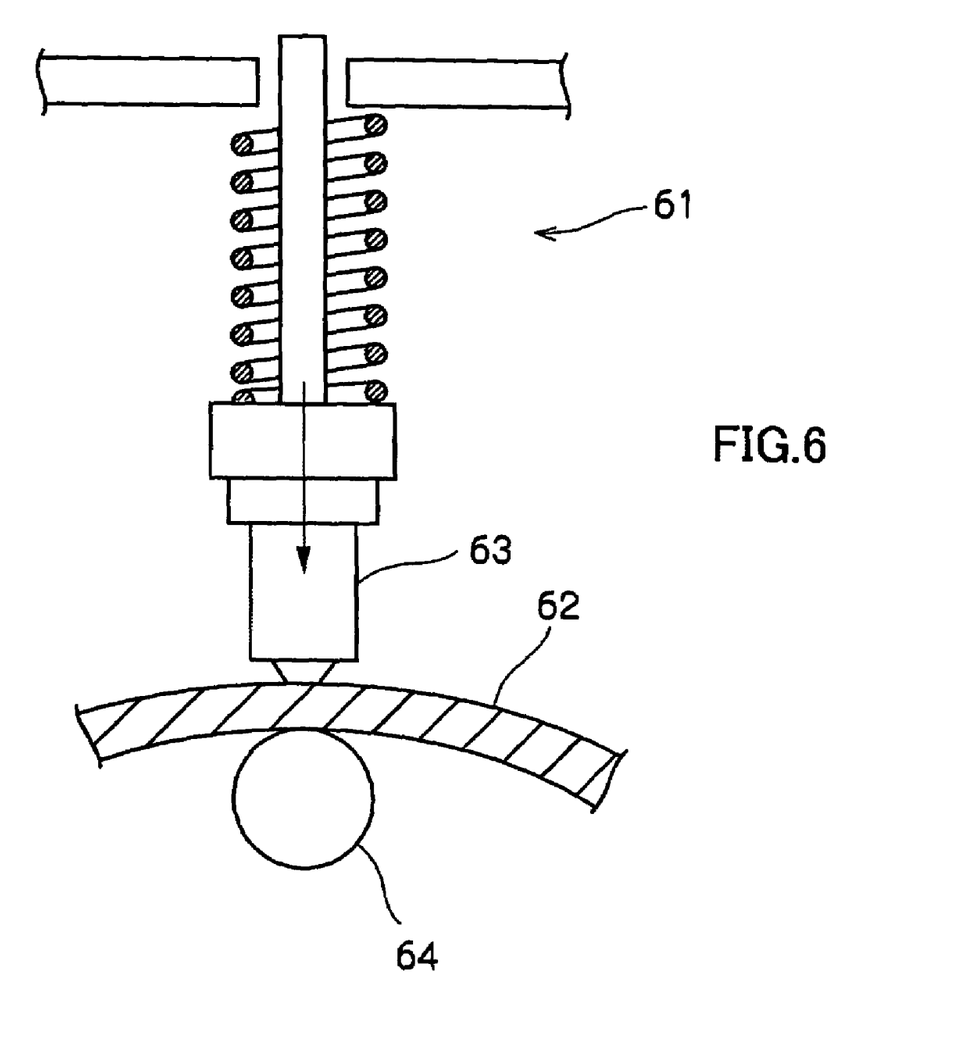
FIG. 6 is a schematic view showing a structure of an NPR-type impact-testing machine.

The impact test for evaluating a degree of adhesion (closely contacting property) of the hard coat film formed to the outer peripheral sliding surface of the piston ring was performed by utilizing an NPR type impact testing machine 61 shown in FIG. 6. In this impact testing machine 61, an impact energy of 43.1 mJ (4.4 kgf·mm) per one impact operation was repeatedly applied to the outer peripheral sliding surface of the piston ring 62 through a pressing metal member 63 as indicated by an arrow. The piston ring 62 was supported by a pad metal member 64.

The degree of adhesion (closely contacting property) of the hard coat film was evaluated by the number of the impacting cycles until a peel-off of the hard coat film occurred. As the test samples, the piston rings of Examples 1 to 8 and Comparative Examples 1 to 4 shown in Table 1 were used. With respect to each of the test samples, the impact test was performed to thereby evaluate a peel-off resistance of the respective hard coat films. Whether the peel-off of the hard coat film occurred or not was evaluated by observing a magnified surface of the piston ring with a magnifying power of 15.

The degree of adhesion was evaluated by a peeling index which is calculated and expressed as a relative ratio of each numbers of the impacting cycles, until the peeling-off of the hard coat films of the test samples of Examples 1 to 8 and Comparative Examples 2 to 4 would occurred, with respect to that of Comparative Example 1 having a standard peeling index of 100.

Therefore, this means that when the peeling index becomes greater than 100, the peeling-off would occur at a greater impacting cycles than that of Comparative Example 1. As a result, the greater peeling index the hard coat film has, the more excellent peel-off resistance the test sample can exhibit.

In this regard, as shown in Table 1, the peeling index of each of the piston rings ranged from 100 to 102, a great influence was not observed, and it was confirmed that all of the test. members exhibited an excellent wear resistance.

In contrast, according to the combinations of the respective Examples, the adhesion (sticking) of the contact surface between the piston ring and the piston ring groove would not occurred at all, so that the following-up property of the piston ring with respect to the cylinder liner could be greatly improved, thus resulting in a high durability of the piston assembly.

Furthermore, in the combination of the piston and the piston ring of the present invention, since the elastic modulus of the piston ring is set to a predetermined range, the following-up up property of the piston ring with respect to

TABLE 1

| | | Piston Ring | | | | Deflection | | | |
|---|---|---|---|---|---|---|---|---|---|
| | Piston Material | Material | Elastic Modulus (MPa) | Hard Coat Film at Outer Peripheral Sliding Surface | Hardness (Hv) | Nitriding Treatment | Adhesion at Contact Surface | Fatigue Strength Index | Abration Index | Peeling Index |
| Example 1 | SKD6 | Flake Graphite Cast Iron | 130,000 | PVD(Cr—N) | 1400 | — | None | 100 | 100 | 100 |
| Example 2 | SKD6 | Flake Graphite Cast Iron | 130,000 | PVD(Cr—B—N) | 2200 | — | None | 101 | 100 | 102 |
| Example 3 | SKD6 | Flake Graphite Cast Iron | 130,000 | PVD(Cr—N) | 1400 | Salt-bath Nitro-carburizing | None | 100 | 99 | 100 |
| Example 4 | SKD6 | Flake Graphite Cast Iron | 130,000 | PVD(Cr—B—N) | 2200 | Salt-bath Nitro-carburizing | None | 101 | 100 | 102 |
| Example 5 | SKD6 | Spheroidal Graphite Cast Iron | 160,000 | PVD(Cr—N) | 1400 | — | None | 100 | 100 | 100 |
| Example 6 | SKD6 | Spheroidal Graphite Cast Iron | 160,000 | PVD(Cr—B—N) | 2200 | — | None | 101 | 98 | 102 |
| Example 7 | SKD6 | Spheroidal Graphite Cast Iron | 160,000 | PVD(Cr—N) | 1400 | Salt-bath Nitro-carburizing | None | 100 | 100 | 100 |
| Example 8 | SKD6 | Spheroidal Graphite Cast Iron | 160,000 | PVD(Cr—B—N) | 2200 | Salt-bath Nitro-carburizing | None | 101 | 99 | 102 |
| Comparative Example 1 | SKD6 | SUS440 | 196,000 | PVD(Cr—N) | 1400 | — | Occurred | 100 | 100 | 100 |
| Comparative Example 2 | SKD6 | SUS440 | 196,000 | PVD(Cr—B—N) | 2200 | — | Occurred | 100 | 99 | 102 |
| Comparative Example 3 | SKD6 | SUS440 | 196,000 | PVD(Cr—N) | 1400 | Salt-bath Nitro-carburizing | Slightly Occurred | 100 | 99 | 100 |
| Comparative Example 4 | SKD6 | SUS440 | 196,000 | PVD(Cr—B—N) | 2200 | Salt-bath Nitro-carburizing | Slightly Occurred | 100 | 98 | 102 |

Notes.
1) PVD denotes an ion-plating film.
2) Hardness is expressed as Vickers hardness (Hv).
3) Elastic modulus is calculated from a stress-strain diagram obtained by tensile test, and expressed with a unit of MPa.

As described above, according to the combination of the piston and the piston ring of the present invention, even in a case where the contact portion between the piston ring and the piston ring groove is applied with a large heat load and micromotion-friction under the condition that the lower surface of the piston ring is closely contacted to the lower surface of the piston ring groove, irregularities are formed on the lower surface of the piston ring due to the influence of graphite peculiar to the cast iron, and the irregularities per se function as oil sumps for lubricating the surface of the piston ring. Simultaneously, the graphite itself functions as a self-lubricating substance, so that the adhesion (sticking) phenomenon would not occur at the contact portion between the piston ring and the piston ring groove as an object member made of steel.

As a result, there can be provided a combination of the piston and the piston ring excellent in durability and capable of being suitably applied to a high-powered internal combustion engine such as a high-powered diesel engine or the like to be operated under the conditions of a high combustion temperature and a high combustion pressure.

the cylinder liner is further improved. Accordingly, it becomes possible to provide the combination of the piston and the piston ring, which is excellent in durability and capable of being suitably applied to a high-powered internal combustion engine.

In addition, in the combination of the piston and the piston ring of the present invention, when the ion plating film is formed on the outer peripheral sliding surface of the piston ring, or the piston ring is subjected to the nitriding treatment, it becomes possible to provide the combination of the piston and the piston ring, which is excellent in wear resistance and durability even under the high powered operating conditions applied to a diesel engine or the like.

Further, it is to be noted that although the present invention has been described with reference to the exemplified embodiments, it will be apparent to those skilled in the art that various modifications, changes, omissions, additions and other variations can be made in the disclosed embodiments of the present invention without departing from the scope or spirit of the present invention.

What is claimed is:

1. A combination of piston and piston ring, comprising:
a piston having a piston ring groove in which at least the piston ring groove is made of SKD6, SUS305 or SUS630, said piston reciprocally moving in a cylinder bore;
a piston ring made of flake graphite cast, iron or spheroidal graphite cast iron, having an elastic modulus ranging from 130000 to 170000 MPa, in which at least a lower surface of the piston ring is formed with irregularity on the surface due to an existence of the graphite and the tower surface of the piston ring is fitted to contact the lower surface of the piston ring groove; and
a hard coat film formed to at least an outer peripheral sliding surface of the piston ring.

2. A combination of piston and piston ring according to claim 1, wherein said hard coat film is an ion-plating film.

3. A combination of piston and piston ring according to claim 1, wherein said piston ring is subjected to a nitriding treatment.

4. A combination of piston and piston ring according to claim 1 wherein said combination of piston and piston ring is a combination of piston and piston ring for an internal combustion engine.

5. A combination of piston and piston ring according to claim 4 wherein said internal combustion engine is a diesel engine.

6. A combination of piston and piston ring according to claim 2 wherein said combination of piston and piston ring is a combination of piston and piston ring for an internal combustion engine.

7. A combination of piston and piston ring according to claim 6 wherein said internal combustion engine is a diesel engine.

8. A combination of piston and piston ring according to claim 3 wherein said combination of piston and piston ring is a combination of piston and piston ring for an internal combustion engine.

9. A combination of piston and piston ring according to claim 8 wherein said internal combustion engine is a diesel engine.

10. A combination of piston and piston ring according to claim 1 wherein the hard coat film is limited to said outer peripheral sliding surface.

11. A method for reducing the tendency of a piston ring to adhere to a piston ring groove made of SKD6, SUS305 or SUS630 in a reciprocating piston of an internal combustion engine, said method comprising:
applying a hard coat film to at least an outer peripheral sliding surface of a piston ring made of flake graphite cast iron or spheroidal graphite cast iron, having an elastic modulus ranging from 130000 to 170000 MPa, in which at least a lower surface of the piston ring is formed with irregularity on the surface due to an existence of the graphite; and
fitting said surface-coated cast iron piston ring into said steel piston ring groove so that said lower surface is fitted to contact the lower surface of the piston ring groove.

12. A method as in claim 11 wherein the hard coat film is limited to said outer peripheral sliding surface.

* * * * *